US008621435B2

(12) United States Patent
Aharoni et al.

(10) Patent No.: US 8,621,435 B2
(45) Date of Patent: Dec. 31, 2013

(54) TIME DEBUGGING

(75) Inventors: Avner Y. Aharoni, Seattle, WA (US);
Mads Torgersen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/645,887

(22) Filed: Dec. 23, 2009

(65) Prior Publication Data

US 2011/0154295 A1      Jun. 23, 2011

(51) Int. Cl.
*G06F 9/44* (2006.01)

(52) U.S. Cl.
USPC ........................................................ 717/125

(58) Field of Classification Search
USPC ........................................................ 717/125
See application file for complete search history.

(56) References Cited

U.S. PATENT DOCUMENTS

| | | | |
|---|---|---|---|
| 7,546,577 | B2 | 6/2009 | Do et al. |
| 7,559,050 | B2 | 7/2009 | Burger |
| 2003/0221186 | A1 | 11/2003 | Bates et al. |
| 2005/0028107 | A1 | 2/2005 | Gomes et al. |
| 2005/0034109 | A1 | 2/2005 | Hamilton et al. |
| 2006/0206856 | A1 | 9/2006 | Breeden et al. |
| 2007/0168984 | A1 | 7/2007 | Heishi et al. |
| 2007/0245322 | A1 | 10/2007 | Anand et al. |

OTHER PUBLICATIONS

Keh, Alex, "Oracle Database 11g on Windows: Development and Deployment", Retrieved at <<http://www.oracle.com/technology/tech/windows/wp/Oracle_Database_11g_on_Windows_Dev_Deploy_TWP.pdf>>, Sep. 2007, pp. 28.
Muller-Albrecht, Robert, "Intel Parallel Debugger Extension for Microsoft Visual Studio", Retrieved at <<http://www.ddj.com/go-parallel/article/showArticle.jhtml?articleID=214502747>>, Feb. 24, 2009, pp. 7.
"Mac OS X Technology Overview", Retrieved at <<http://developer.apple.com/mac/library/DOCUMENTATION/MacOSX/Conceptual/OSX_Technology_Overview/OSX_Technology_Overview.pdf>>, Aug. 14, 2009, pp. 185.
"UML StateWizard", Retrieved at <<http://www.intelliwizard.com/>>, 2009, pp. 5.
"Luminosity Enterprise-strength Tools for Embedded Development", Retrieved at <<http://www.lynuxworks.com/products/eclipse/luminosity.pdf>>, 2008, pp. 4.
Notification of Transmittal of the International Search Report and the Written Opinion of the International Searching Authority mailed Jul. 18, 2011.
Written Opinion of the International Searching Authority mailed Jul. 18, 2011.

*Primary Examiner* — Chun-Kuan Lee

(57) ABSTRACT

A design time debugging tool provides debugging information available from the compiler during design time, as if a user were debugging code that provided the debugging information, by exposing information available from the compiler without initiation of a debugging session and without executing the program being debugged.

20 Claims, 9 Drawing Sheets

DEBUGGING A REGULAR
APPLICATION DURING
RUN TIME (PRIOR ART)

DEBUGGING AN APPLICATION THAT
IS AN EXTENSION TO AN EXISTING
BODY OF CODE DURING RUNTIME

```
ConsoleApplication17.Program
    using System;
    using System.Collections.Generic;
    using System.Linq;
    using System.Text;
    using System.Xml.Linq;

Namespace ConsoleApplication17
    {
        class Program
        {
            static void Main(string() args)
            {
    176     var x = new         177
                XElement("fff");
                Console.WriteLine(x);
            }
        }
                            178
    }
```

| Watch 1 | | |
|---|---|---|
| Name | Value | Type |
| - x | <fff /> | System.X... |
| + base | <fff /> 180  182 | System.X... |
| + FirstAttribute | null | System.X... |
| HasAttributes | false | boolean |
| HasElements | false | boolean |
| IsEmpty | true | boolean |
| - LastAttr | null | System... |
| +Static members | | |
| + LastAttribute | null | System.X... |
| + Name | {fff} | System.X... |
| + name | {fff} | System.X... |
| NodeType | Element | System.X... |
| Value | "" | string |

PRIOR ART

FIG. 1f

| Module1.vb X | Source Control Explorer — 184 |
|---|---|
| Module1 | Main |

```
 Imports System
-Module Module1

-   Sub Main()using System.Xml.Linq;
        Console.WriteLine("fff")
    End Sub                    187

End Module
                        188
```

186

| Compiler Watch 190 | 192 | 194 |
|---|---|---|
| Name | Value | Type |
| - CallStatementNode | Console .WriteLine(System.C... | Microsoft.VisualB... |
|   - Children | Count = 2 | System.Collection... |
|     + QualifiedNode | Console .WriteLine | Microsoft.VisualB... |
|     + ArgumentNode | "Somestr" | Microsoft.VisualB... |
|   Kind | CallStatement | Microsoft.VisualB... |
|   CallKeyword | Nothing | Microsoft.VisualB... |
|  + Target | Console .WriteLine | Microsoft.VisualB... |
|  + LeftParenthesis | LeftParenthesis | Microsoft.VisualB... |
|  + RightParenthesis | Count = 1 | System.Collection... |
|  + Arguments | RightParenthesis | Microsoft.VisualB... |
|   HasSyntaxError | False | System.Boolean |
|  + Comments | Count = 0 | System.Collection... |
|   Next | Nothing | Microsoft.VisualB... |
|   Previous | Nothing | Microsoft.VisualB... |
|  + Parent | Microsoft.VisualBasic.Interop... | Microsoft.VisualB... |

TIME DEBUGGING

BACKGROUND

Debugging refers to the process of inspecting and observing a computer program behavior and state during execution of the program. Traditional debugging tools allow program execution to be stopped at a specific line of code or when a specific condition occurs, at which time the developer can inspect program state. For example, for variables that are in scope, the developer can see the values of the variables at the time that the program execution broke. The developer can also run new code in the context of the debugged program and observe the new state of the application and its data structures. This practice is commonly used for the purpose of finding and correcting bugs (defects) in a computer program so that it executes as expected and in the process of writing new applications or functionality where observing the behavior of an existing application is helpful. Debugging in general is a time-consuming, tedious task. Often debugging tools are provided to make the job a little less onerous.

Run time debugging tools are software tools that enable a developer or tester to monitor the execution of a program. The user can stop or pause the execution of the program, re-start it, set breakpoints, inspect values in memory, change values in memory and so on. Run time debugging tools provide information about a running instance of the program and are not able to provide information during design time.

SUMMARY

When creating plug-ins, add-ons, automation components or extensions (hereafter called "extensions" herein) for applications that have an extensibility model, debugging becomes a useful technique to inspect and explore the application's state when the extension is running in the context of the application. It is helpful to have knowledge of the data structures and object models that are created based on the different states of the extension. Today, information about the data structures and object models of the application associated with a particular state of the extension is typically provided by run time debugging of the extension as it executes within the context of a particular instance of the application but is not available when the extension is not executing. As described herein, information based on the data structures and objects of an instance of the application is exposed during regular interaction with the application, without having to execute and debug the extension. Examples of such applications include but are not limited to Visual Studio® and Microsoft® Office. Examples for such extensions include but are not limited to coloring in Visual Studio® or macros in Microsoft® Office.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1f is an example of a run time debugging user interface as is known in the prior art;

FIG. 1g is an example of a design time debugging user interface in accordance with aspects of the subject matter disclosed herein;

DETAILED DESCRIPTION

Overview

Some integrated development environments (IDEs) such as Eclipse, Visual Studio® and others include an array of debugging tools. For example, some IDEs include an interactive, run time debugger that can be used for debugging applications written in any language supported by the IDE. The debugger may be able to attach to a running process inside or outside of the IDE to monitor and debug that process. If source code for the running process is available, the debugger may be able to display the source code as the program is being run. If source code is not available, the debugger may be able to show the disassembly.

The debugger may allow a developer or other user to set breakpoints that allow execution to be stopped temporarily at a certain point in the code, values of objects created during execution of the program being debugged to be inspected and changed and execution to resume. The debugger also may support user interfaces such as watch windows in which the values of variables are monitored and displayed as execution of the program continues. Breakpoints may be able to be conditional, meaning that a breakpoint can be triggered when a specified condition is met. A user may be able to execute one line of source code at a time, step into functions to debug inside the function, or step over a function, hiding what happens during execution of the function body. In some debuggers, during a debug session, if a user hovers a mouse pointer over a variable, the current value of the variable may be displayed in a data tooltip where the value can also be modified if desired. The debugger may include an expression evaluator feature that can evaluate an expression in the context and state of the debugged application.

Figure 1A:
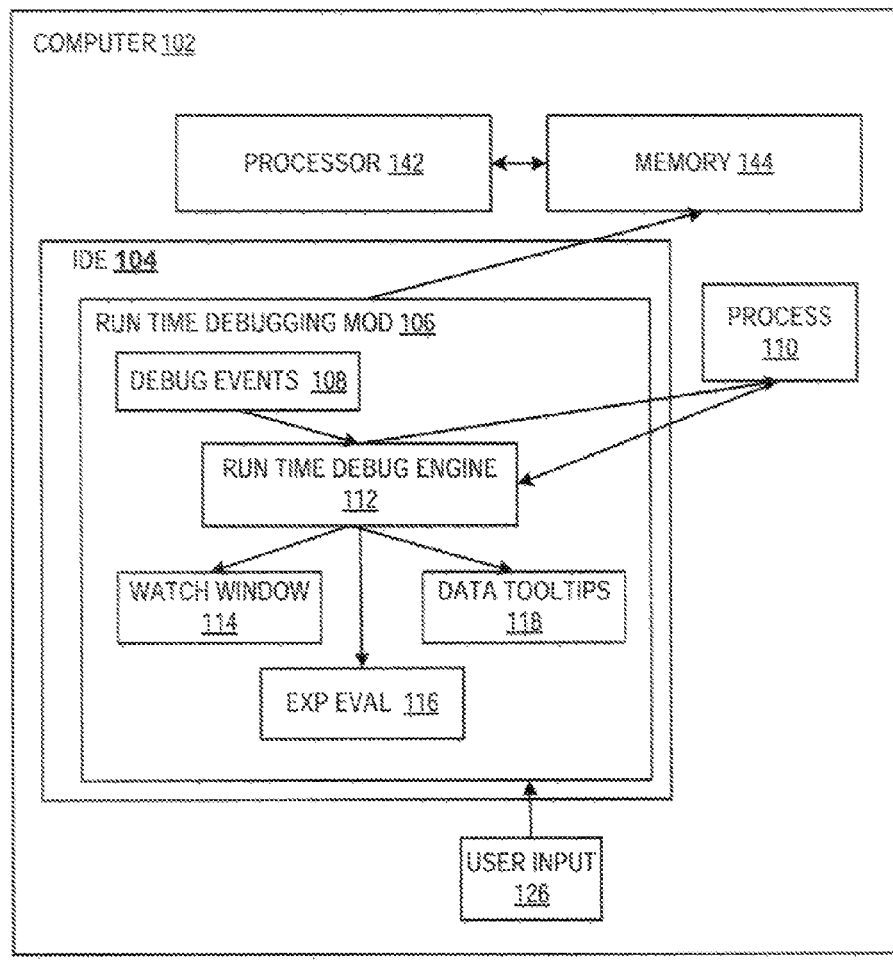
FIG. 1a is a block diagram of an example of a known run time debugging system.

FIG. 1a is an illustration of a known integrated development environment (IDE) 104 such as Microsoft® Visual Studio®, Eclipse, Microsoft® Office or other IDE, executing on a computer 102 having a processor 142 and a memory 144. IDE 104 may include a run time debugging module 106 that includes a run time debug engine 112 that monitors debug events 108 occurring during execution of a process 110 during a debug session and provides one or more debug user interfaces such as a watch window 114, data tooltips 118 and an expression evaluator 116 and accepts user input 126 within the debug user interface. Debugging a user application during run time is illustrated in FIG. 1c. Within an instance (instance 1) of the IDE 128, a run time debug engine 132 executing on a computer 102 may monitor a run time process being debugged 134, and display the source code 130 associated with the run time process being debugged 134 as the debug session proceeds. Run time debug user interface 136 (e.g., a watch window, tool top, etc.) can be displayed. FIG. 1f, described more fully below, illustrates such a run time watch window.

Suppose, however, that a developer wants to write some code that executes within the context of another program. An example of code that executes in the context of another program is code that is an extension to an application such as an IDE. Suppose, for example, the extension code provides a refactoring functionality and that the extension code manipulates user code by reordering parameters a and b of a function A. Today, to determine if the extension code operates correctly on function A, the developer writes the extension code and incorporates the extension into the IDE of a user project that includes some code where function A is used. The developer then gets the compiler's view or representation of the user code by starting the compiler within the user project. He attaches a debugger to the parameter reordering code in another instance of the IDE. He inserts breakpoints in the extension code and when a breakpoint is encountered, the developer steps through the data structures created by the compiler from the user code to see if the extension code has had the desired effect on the user code.

Figure 1B:
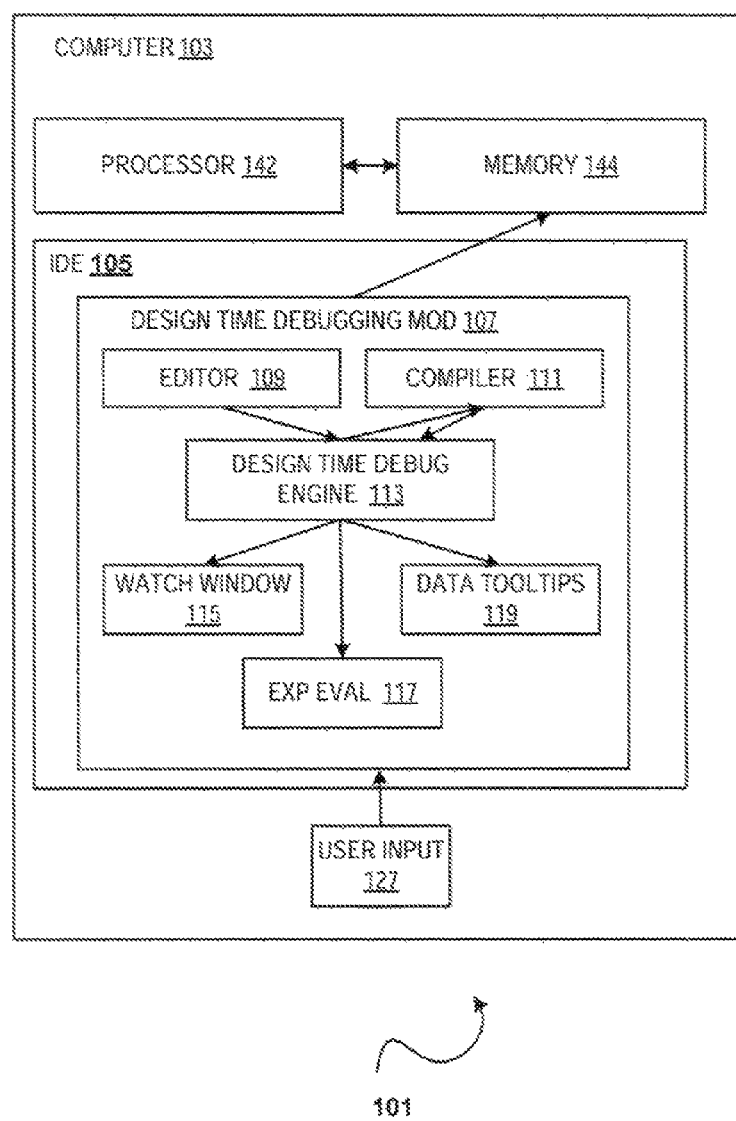
FIG. 1b is a block diagram of an example of a design time debugging system in accordance with aspects of the subject matter disclosed herein.
Figure 1C:
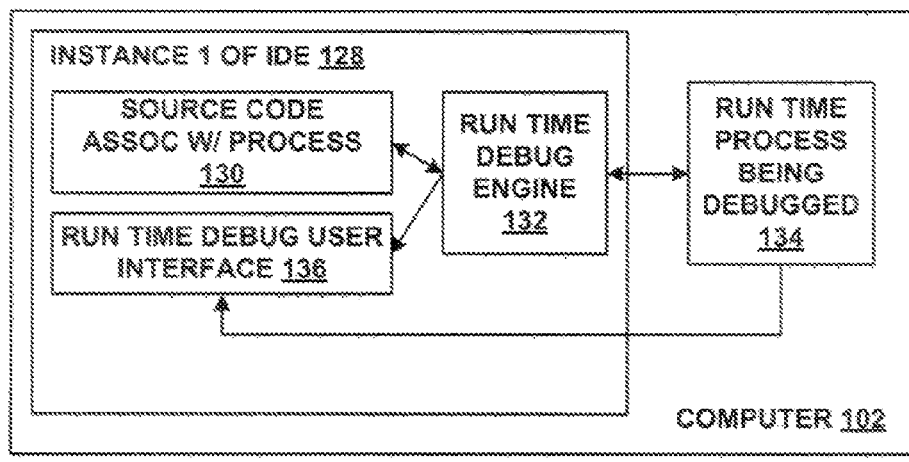
FIG. 1c is a block diagram illustrating debugging a regular application during run time as is known in the prior art.
Figure 1D:
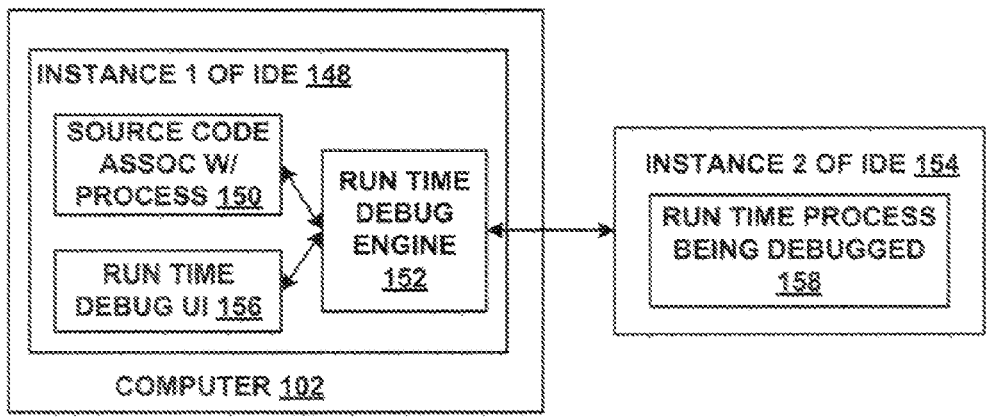
FIG. 1d is a block diagram illustrating debugging an application that is an extension to an existing body of code during run time, as is known in the prior art.

FIG. 1d illustrates run time debugging of a program on a computer 102 that runs within the context of a second program, as is known in the prior art. The program that runs within the context of the second program may be extension code. A first instance (instance 1) of the IDE 148, including the executable for the extension code, is instantiated and a run time debug engine 152 may monitor the run time process being debugged 158 and display the source code 150 associated with the run time process being debugged 158. The run time debug engine 152 is associated with a process comprising a second instance (instance 2) of the IDE 154 in which the extension code (the run time process being debugged 158) is running Run time debug user interface 156 displays run time debug information for the debug session, and may show the compiler representation of the user code as manipulated by the extension code.

Figure 1E:
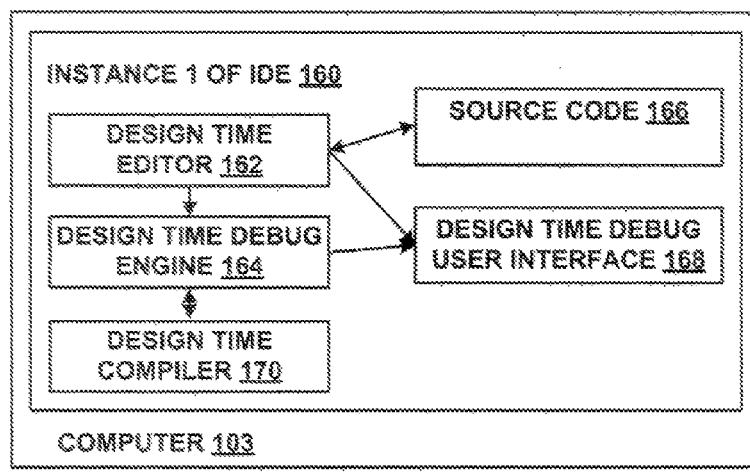
FIG. 1e is a block diagram illustrating debugging a design time compiler's representation of source code during design time using the debugging metaphor in accordance with aspects of the subject matter disclosed herein.

In accordance with aspects of the subject matter disclosed herein, as illustrated in FIG. 1e, in contrast to the above, a single instance of an IDE 160 is instantiated on a computer 103. A design time editor 162 displays source code 166 under interactive development by a user. The source code 166 displayed in the design time editor 162 may comprise extension code, that is, code that acts upon or extends the functionality of another application. The extension code may act upon a particular user instance of a type of application. For example, the extension code may extend the functionality of a user's Excel® spreadsheet. Alternatively, the extension may extend the functionality of a source code editor for a particular language in an IDE in which a particular user project has been loaded and so on. The design time editor 162 raises events representing developer changes to the extension code during interactive development of the extension code. The events raised by the design time editor 162 are monitored by the design time debug engine 164.

The design time debug engine 164 in response to the events raised by the design time editor 162 can request information from the design time compiler 170. The information requested can include information about objects created by the compiler associated with the code on which the extension acts, information associated with user files including code files, designer artifacts, resource files, and so on, objects associated with the compiler, objects associated with the IDE responsive to user interactions with the IDE. This information can be formatted and displayed in the design time debug user interface 168, as described more fully below, even though the extension code is not being executed. The design time debug engine 164 also monitors user interactions in the design time debug user interface 168 and in response thereto, may change the display of source code 166 in the design time editor 162 or may change the information displayed in the design time debug user interface 168. For example, a section of code in the source code editor may be highlighted in response to a user interaction in the design time debug user interface 168, and so on.

It will be appreciated that in the above illustrative, non-limiting examples, the user code being manipulated by the extension code can be a hosting application and the extension code can be a hosted application. Aspects of the subject matter disclosed herein can be similarly applied in other hosting scenarios such as but not limited to any extensible application including but not limited to Microsoft® Excel®. For example, most browsers are extensible, having plug-ins to support Flash applications, Java applets and so on. Such a plug-in may display the browser object model as a user interacts with the webpage. In accordance with aspects of the subject matter disclosed herein, similar information concerning a particular state of the hosting application is available during design time of the hosted application and is displayed in the design time debug user interface.

Design Time Debugging

A software extension, as the phrase is used herein, is a computer program that is designed to be incorporated into another piece of software to enhance or extend the functionalities of the software into which it is incorporated. That is, the software extension is supposed to be run within the context of or to be hosted by another (hosting) application. Other terms used to denote software extensions are add-ons, add-ins or plug-ins. On its own, a software extension is typically not useful or functional. Examples of software applications that support extensions include Visual Studio® and Eclipse, browsers such as the Mozilla Firefox Web browser, and applications such as Adobe Systems Photoshop, Microsoft® Excel® and Microsoft® Windows Explorer, all of which provide for extensions. Commonly, applications whose scope is potentially unbounded will feature an extensions application programming interface (API). Descriptions of the APIs are often published so that third-party developers can produce extensions.

One of challenges of writing software extensions is understanding the APIs and the data structures of the hosting application in any given state of the end user (hosting) program. For example, in a development environment, understanding the language compilers and the data structures created by the language compilers is a non-trivial endeavor. Today, to be able to see the data structures of the hosting program, a debugger has to be attached to the software extension (hosted) code that uses the data structures. To be able to attach a debugger to the software extension code, the developer has to write code inside the extension that has the development environment and compiler objects in scope. He has to set the correct high level context for these objects (e.g., load in the correct files or project that the extension is loaded in). After that, often, more specific information has to be found to be able to display the relevant part of a data structure. For example, it may be insufficient to get a full parse tree for a particular open file in the development environment. Instead displaying a particular parse node may be much more helpful. A more particular context may be provided so that the particular parse node can be displayed, by, for example, using a current location of a cursor in an editor.

After the code is syntactically correct, the developer compiles and deploys the code in the IDE so that the next time the development environment is started, the extension will be included in the running code. Finally, the development environment is started, a project encapsulating the desired scenario is opened, a debugger is attached to the running application (extension code) and debugging tools are used to investigate the applicable data structures.

Suppose, for example, a developer is writing a software extension comprising an extension to a compiler and wants to debug the compiler as it is running on a user instance of an order processing program. If the developer wants to determine how the compiler looks at the order processing code, he starts the compiler within the user project, attaches a debugger to the compiler process and inserts breaks to determine the compiler view of the order processing program. That is, the compiler API is investigated as it has a specific state where the input is the executing order processing program. Two instances of the development environment are running: one in which the order processing program is running and one in which the compiler that manipulates the order processing program is running.

In contrast, in accordance with aspects of the subject matter disclosed herein, debug information for the software extension for the active document or project is provided as if the user were debugging code that provided this data. This information is provided by exposing known information about the environment using tools such as the compiler watch window and other traditionally run time debug user interfaces such as data tooltips and expression evaluators without creating a run time debugging session. The design time debugging information is provided automatically as the user changes application state without user intervention.

FIG. 1b illustrates an example of a system 101 that performs design time debugging on a computer 103 in accordance with aspects of the subject matter disclosed herein. All or portions of system 101 may reside on one or more computers such as the computers described below with respect to FIG. 3. All or portions of system 101 may reside on one or more software development computers such as the computers described below with respect to FIG. 4. The system 101 or portions thereof may comprise a portion of an integrated development environment (e.g., IDE 105) such as the ones described and illustrated below with respect to FIG. 4. Alternatively, system 101 or portions thereof may be provided as a stand-alone system or as a plug-in or add-in.

System 101 may include one or more of: a processor (such as processor 142), a memory 144, and a design time debugging module 107. Other components well known in the art may also be included but are not here shown. It will be appreciated that design time debugging module 107 can be loaded into memory 144 to cause one or more processors such as processor 142 to perform the actions attributed to the design time debugging module 107. Design time debugging module 107, in accordance with aspects of the subject matter disclosed herein, may receive one or more of: user input 127 and one or more data sources (not shown) and display substantially simultaneously: source code of an extension (first program) under interactive development and run time debugging information based on data structures and/or objects associated with an instance of an extensible IDE in a design time debug user interface without executing the extension. The information displayed in the design time debug user interface can be displayed automatically (e.g., without human intervention to request the display of the information). Moreover, the information displayed in the design time debug user interfaces can change automatically responsive to user interaction manipulating the application. For example, information displayed in the design time debug user interfaces can change automatically responsive to user interaction manipulating source code of an IDE, or by user interaction manipulating the information presented in the design time debug user interfaces. The information presented in the design time debug user interfaces may include run time debug information based on execution of the application (second program).

The design time debugging module may include one or more of: an application that is associated with a user interface and with an extensibility API that allows a user to observe and manipulate the application's data structures. For example, the design time debugging module may include an application such as Excel® having a user interface that enables a user to set up a spreadsheet and program tasks using macros and an extensibility API that allows a user to observe and manipulate the data structures generated by Excel®.

The design time debugging module 107 may include one or more of: an editor 109, a compiler 111 and a design time debug engine 113. Editor 109 may comprise a source code editor. Editor 109 may generate design time editing events based on user input manipulating the source code of the first program, changes to cursor position or focus in the source code editor, edits to or manipulation of source files, or by receiving an event caused by a user clicking on relevant menu items. Editor 109 may send the design time editor events to the design time debug engine 113.

The design time debug engine 113 may request an updated view of data structures, objects and so on from the compiler 111 based on the received editor events. Compiler 111 may represent a background compiler, dynamic parser or parallel compiler. As code is being written, such a compiler may compile the code in the background to provide feedback about syntax and compilation errors, which may be flagged with an indicator such as a red wavy underline or the like. Warnings may also be marked, such as with a green underline or the like. The compiler 111 may generate or refresh a language model, and send a refreshed view of the current language model, compiler-generated objects, compiler-generated data structures, IDE objects, IDE data structures and so on to the design time debug engine 113 in response to requests received from the design time debug engine 113.

Design time debug engine 113 can generate run time debugging information based on the information received from the compiler 111 or application and display the run time debugging information in design time debug user interfaces such as debugger windows available at design time when the end user is interactively writing code. Information that populates the design time debug user interfaces can be responsive to user events such as changes to cursor position in the source code editor, edits to source files, by receiving a user interaction such as an event caused by the user clicking on relevant menu items, or by user interaction with the design time debug user interfaces.

When such an event is detected or received by the design time debug engine 113, the design time debug engine 113 may ask the compiler 111 to refresh the compiler's representations of data structures or objects associated with an instance of the second program, or representations of data structures or objects associated with the compiler or IDE. The information returned to the design time debug engine 113 by the compiler may be presented to a user through design time debug user interfaces that resemble traditional run time debugging user interfaces displayed during a traditional run time debug session. The design time debug user interfaces include but are not limed to a watch window 115, an expression evaluator 117 and data tooltips 119. The information displayed in the design time debugging user interfaces presents information that is based on the compiler view of the state of the hosting (second) program. The information may include information about files, compiler objects and references. It will be appreciated that this run time debug information is displayed without execution of the first program, during development of the first program during design time.

The design time debug engine 113 may also monitor user interactions with the design time debug user interface(s). In response to detecting a user interaction within the editor 109 or within the design time debug user interface, the content of the information displayed in the design time debug user interface may be automatically refreshed or modified. In response to detecting a user interaction within the design time debug user interface, the appearance of information displayed in the design time editor may be automatically modified, for example a section of source code may be highlighted, and so on.

FIG. 1*f* is a representation of an example of a display 172 as might be displayed during a run time debug session, as is currently known in the art. One portion of display 172 displays the source code for a program ConsoleApplication17 174. The program ConsoleApplication17 174 creates a variable x, of type Element, assigns the value "fff" to x (line 177) and writes the value of x on the console. A breakpoint 176 has been placed on the Console.WriteLine(x); line. During execution of ConsoleApplication17, when the breakpoint is reached, execution of ConsoleApplication17 stops and a run time debugging watch window, Watch 1 178 is displayed. Watch 1 178 displays the value 180 of x ("fff") and the type 182 of x (System.XElement . . . ), the different properties of x (FirstAttribute, HasAttributes, HasElements, IsEmpty, LastAttribute and so on). For each property, the information shown can be expanded so that for instance by clicking on the plus sign in front of FirstAttribute all the members of this property are shown. The information shown in the run time debug session reflects information known about an actual object pointed to by x, created during execution of the program ConsoleApplication17 174.

In contrast, FIG. 1*g* is an example of a display 184 for a design time debug user interface 188 as might be displayed during interactive design time development of software extension code Module 1 186 in and editor As a developer types in the code of Module1 186 in a design time editor, a design time debug user interface such as design time debug user interface 188 is automatically displayed. No debug session is initiated. Module 1 is not executing. As the developer navigates within the code (using the cursor, for example), the design time debug user interface, displays information about the compiler object that is associated with the point at which the cursor is located. The information that is displayed in the design time debug user interface 188 can include information concerning types inherent to the compiler 111 and objects created by the compiler 111 to represent types of members that are associated with the description of the source code, data structures and objects created by the compiler 111 and data structures and objects associated with the IDE in which the compiler is executing.

For example, design time debug user interface 188 displays the call statement node CallStatementNode 190, that is the compiler's representation of the console writeline method call (Console.WriteLine("fff") line 187. CallStatementNode 190 represents an object that describes the line (Console.WriteLine("fff") line 187 in the source code 186. By looking at design time debug user interface 188, the value of CallStatementNode 190: (Console-WriteLine(System.Collections.Object)) 192 can be ascertained, as can the type of CallStatmentNode 190: (Microsoft®.VisualBasic.Syntax.CallStatement) 194. The design time debug user interface 188 displays information concerning the children of CallStatementNode 190. One of the children of CallStatementNode 190 is the method to be called. The method to be called is represented by the property QualifiedNode 196 which points to an object that represents the method. The value of the object pointed to by QualifiedNode 196 is Console-.WriteLine 198. The type of QualifiedNode 196 is one of the types inside the compiler 111: Microsoft®.VisualBasic.Syntax.QualifiedNode. Thus the design time debug user interface 188 displays a tree structure that represents the syntax tree of the code displayed in the source code editor, e.g., source code 186. The root node of the tree is the call statement node that represents the whole line of code. The tree itself includes subtrees representing the method being called, the arguments for the method and so on. Each of the items displayed in design time debug user interface 188 can itself be inspected by selecting the item to be expanded.

Figure 2:
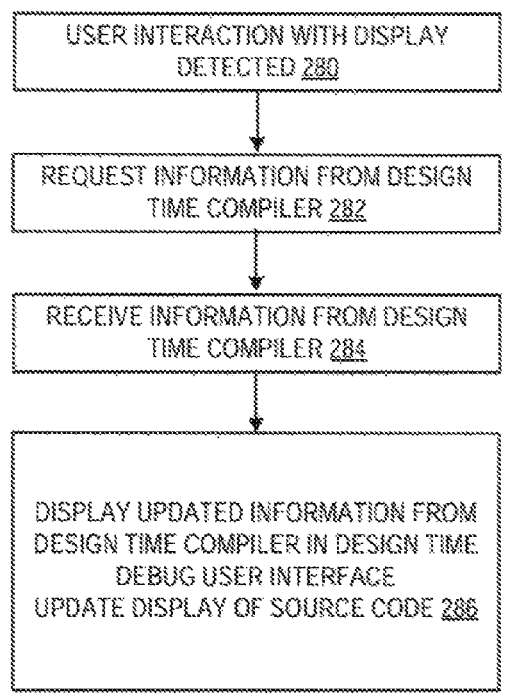
FIG. 2 is a flow diagram of an example of a method for design time debugging in accordance with aspects of the subject matter disclosed herein.

FIG. 2 illustrates an example of a method 200 to perform design time debugging in accordance with aspects of the subject matter disclosed herein. Source code, under interactive development during design time, for a first program that executes within the context of a second program is displayed substantially simultaneously with debugging information based on data structures and objects associated with an instance of the second program. A design time debug engine, such as the one described above with respect to FIGS. 1*b*, 1*e* and 1*g* monitors editor events generated as a result of user input received by a design time editor such as editor 109. The design time debug engine also monitors events generated as a result of user input in the design time debug user interface, described above. User input within the source code editor can include developing and editing source code for a software extension.

When an editing event is detected by the design time debug engine 280, the design time debug engine requests an application or compiler such as compiler 111 described above to refresh its view of data structures and objects associated with the second program 282. In response to receiving the updated information from the compiler 284, the design time debug engine displays design time debugging information 286 as described above with respect to FIG. 1*g*. When a user interaction with the design time debug user interface is detected by the design time debug engine 280, the design time debug engine requests a compiler such as compiler 111 described above may request a different view of data structures and objects associated with the second program. In response to receiving the updated information from the compiler 284, the design time debug engine displays design time debugging information 286 as described above with respect to FIG. 1*g*. In a manner similar to the behavior of the runtime debug user interfaces, the design time debug engine may also monitor user interaction with the design time debug user interfaces and responsive thereto, modify the display of the source code in the editor. For example, in response to receiving user input selecting a node in the design time debugging user interface, a section of the source code displayed in the editor corresponding to that node may be highlighted in the editor. When a user types an expression in the design time watch window the result of this expression can be reflected in the application itself, e.g., in the source editor.

Example of a Suitable Computing Environment

Figure 3:
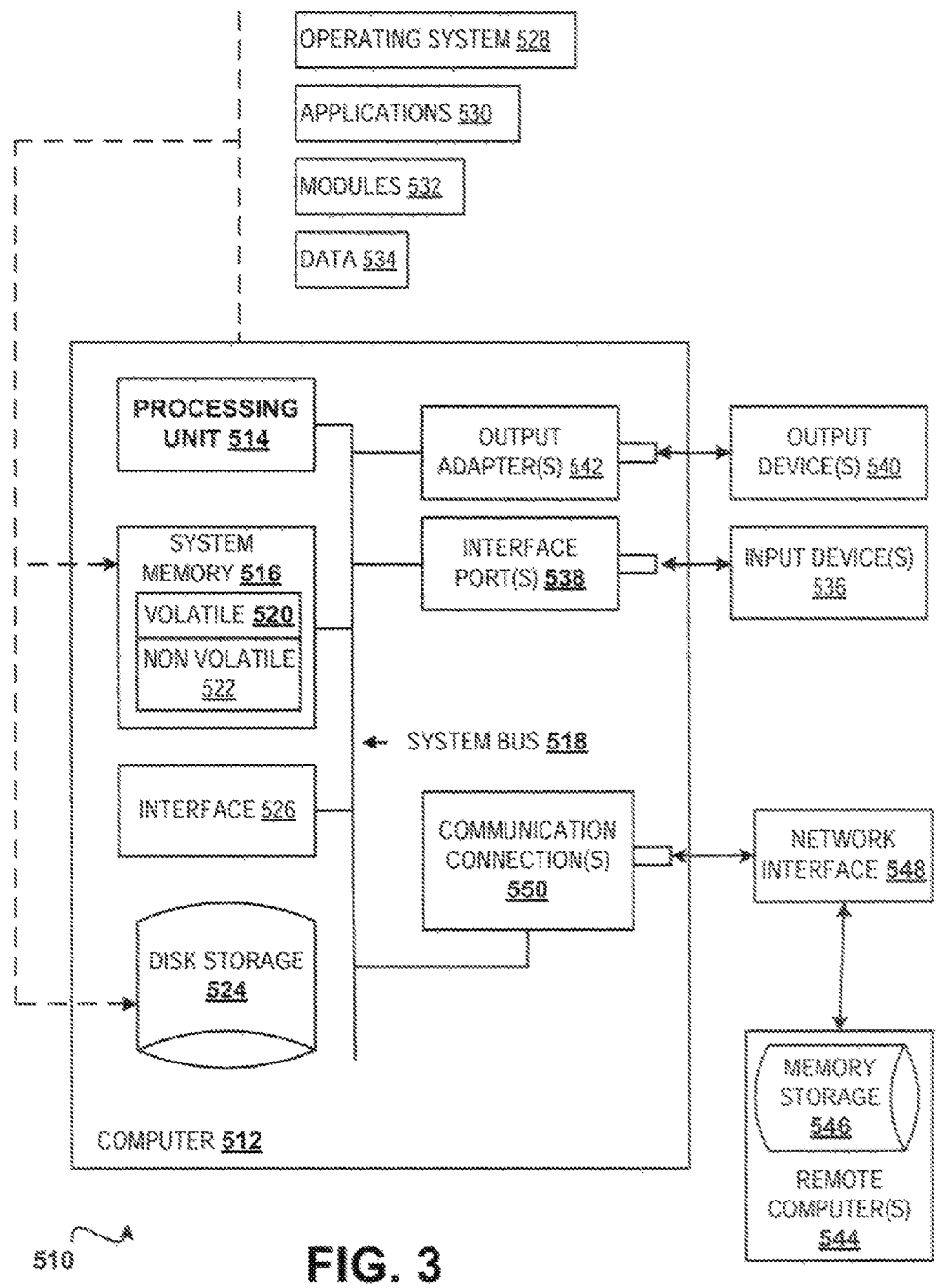
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for software development in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
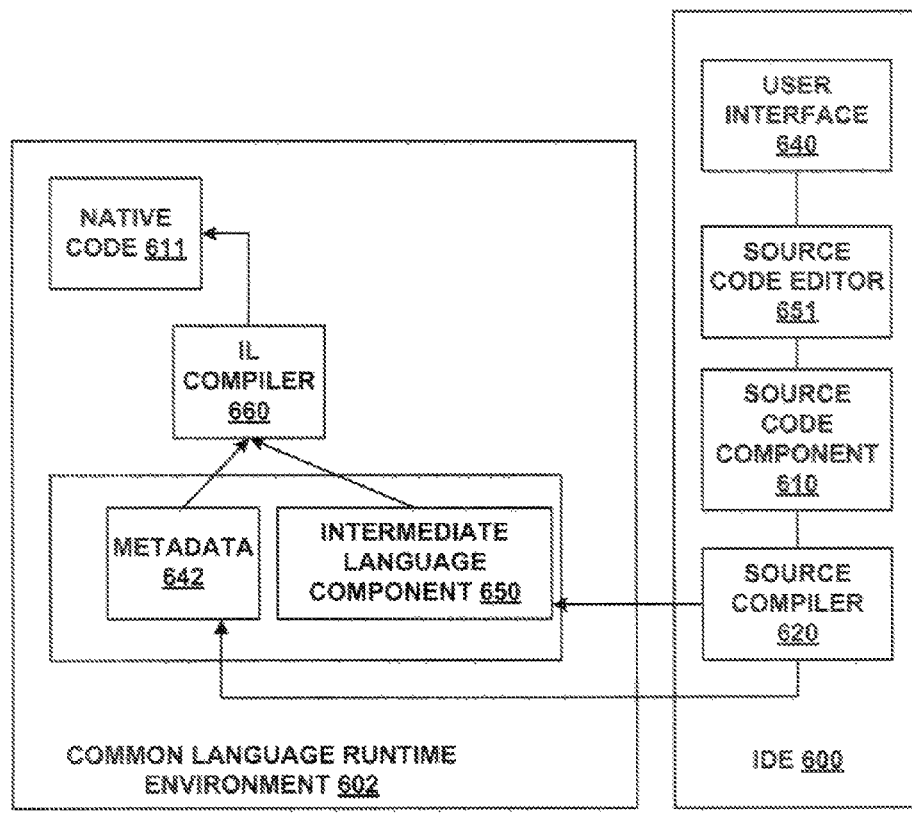
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
   a processor of a software development computer;
   a memory coupled to the processor;
   a design time debugging module loaded into the memory that automatically displays simultaneously during design time of a first program:
      source code of the first program in a design time editor, wherein the first program executes within a context of a second program; and
      run time debugging information in a design time debugging user interface, the run time debugging information based on data structures or objects associated with an instance of the second program, without executing the first program.

2. The system of claim 1, wherein the design time editor that generates design time editor events based on user input manipulating the source code of the first program and sends the design time editor events to the design time debugging module.

3. The system of claim 1, further comprising a background compiler that in response to receiving a request from the design time debugging module, returns information to the design time debugging module, wherein the information returned is responsive to the received request and wherein the information returned is based on the data structures or objects associated with the instance of the second program.

4. The system of claim 1, wherein the design time debugging module monitors user input manipulating the run time debugging information displayed in the design time debugging user interface.

5. The system of claim 4, wherein in response to detecting the user input manipulating the run time debugging information displayed in the design time debugging user interface, the design time debugging module modifies appearance of the source code of the first program in the design time editor or modifies content of the debugging information displayed in the design time debugging user interface.

6. The system of claim 1, wherein the design time debugging user interface comprises a compiler watch window, a data tooltip or an expression evaluator.

7. The system of claim 1, wherein content of the design time debugging user interface changes responsive to cursor position in the design time editor.

8. A method comprising:
   displaying simultaneously during design time of an extension to an extensible application:
      source code of the extension in a design time editor executing on a software development computer, wherein the extension executes within a context of the extensible application; and
      run time debugging information based on data structures and objects associated with an instance of the extensible application in a design time debug user interface.

9. The method of claim 8, further comprising:
   receiving a design time editor event during design time of the extension, wherein the design time editor event comprises an event generated in response to user input manipulating the source code of the extension.

10. The method of claim 9, further comprising:
    in response to receiving the design time editor event, sending a request for information concerning data structures or objects associated with the instance of the extensible application.

11. The method of claim 8, further comprising:
    modifying appearance of the source code of the extension in response to detecting user input manipulating the debugging information based on the data structures and objects associated with the instance of the extensible application.

12. The method of claim 8, further comprising:
    modifying debugging information based on the data structures and objects associated with the instance of the extensible application in response to user input manipulating the source code of the extension.

13. The method of claim 8, further comprising:
    modifying debugging information based on the data structures and objects associated with the instance of the extensible application in response to user input manipulating the debugging information in the design time debug user interface.

14. The method of claim 8, wherein the design time debugging user interface comprises a watch window, a data tooltip or an expression evaluator.

15. A computer-readable storage device comprising computer-executable instructions which when executed cause at least one processor to:
    display run time debugging information in a design time debugging user interface based on compiler and integrated design environment data structures associated with a first program while displaying simultaneously source code of a second program during design time of the second program, the second program comprising extension software having a capability to execute within context of the first program.

16. The computer-readable storage device of claim 15, comprising further computer-executable instructions, which when executed cause the at least one processor to:
  display run time debugging information in the design time debugging user interface based on compiler objects and integrated design environment objects.

17. The computer-readable storage device of claim 15, comprising further computer-executable instructions, which when executed cause the at least one processor to:
  change appearance or content of the display of the source code of the second program responsive to user input in the design time debugging user interface.

18. The computer-readable storage device of claim 15, comprising further computer-executable instructions, which when executed cause the at least one processor to:
  change content of the display of the design time debugging user interface responsive to user input in the design time debugging user interface.

19. The computer-readable storage device of claim 15, comprising further computer-executable instructions, which when executed cause the at least one processor to:
  change content of the display of the design time debugging user interface responsive to user input in the source code of the second program.

20. The computer-readable storage device of claim 15, comprising further computer-executable instructions, which when executed cause the at least one processor to:
  display the run time debugging information in the design time debugging user interface without initiating a run time debug session.

* * * * *